United States Patent [19]

Brick et al.

[11] 4,398,234

[45] Aug. 9, 1983

[54] FLUSH PRECIPITATION STATIC DISCHARGER SYSTEM FOR AIRCRAFT

[75] Inventors: Rowan O. Brick, Bellevue; Charles H. King, Kent, both of Wash.

[73] Assignee: The Boeing Company, Seattle, Wash.

[21] Appl. No.: 305,818

[22] Filed: Sep. 28, 1981

[51] Int. Cl.³ .............................................. E05F 3/00
[52] U.S. Cl. .................................. 361/218; 244/1 A; 361/222
[58] Field of Search ............... 361/216, 217, 218, 220, 361/222; 244/1 A

[56] References Cited

U.S. PATENT DOCUMENTS

| | | | |
|---|---|---|---|
| 1,419,261 | 6/1922 | Howard | 361/218 |
| 2,933,732 | 4/1960 | Tanner | 361/218 X |
| 3,906,308 | 9/1975 | Amason et al. | 361/218 |
| 4,237,514 | 12/1980 | Cline | 361/218 X |

FOREIGN PATENT DOCUMENTS 690379 4/1953 United Kingdom ................ 361/218

*Primary Examiner*—Harry E. Moose, Jr.
*Attorney, Agent, or Firm*—Conrad O. Gardner; Bernard A. Donahue

[57] ABSTRACT

A flush, zero drag discharger system for dissipating static electric charges from surfaces of high performance aircraft and similar vehicles which is capable of withstanding a severe lightning environment without substantial degradation of the system. The discharger system includes a configuration of the vehicle secondary structure into non-electrically conductive areas, conductive high corona threshold areas, and controlled low corona threshold electrostatic discharge areas which are protected from the detrimental effects of lightning by the utilization of ionization-type lightning diverters.

5 Claims, 24 Drawing Figures

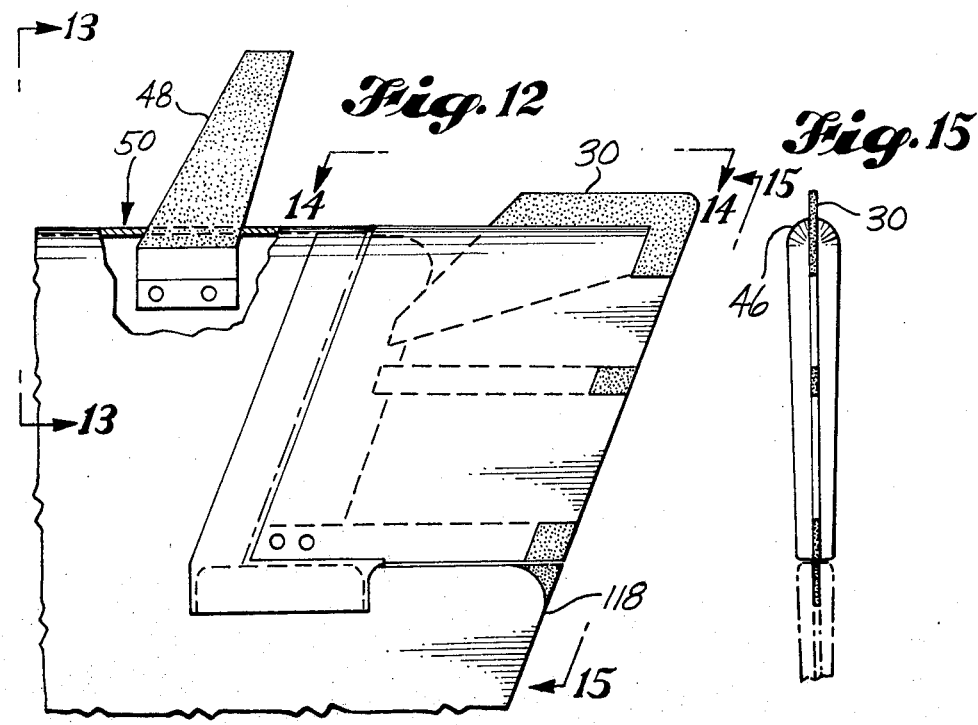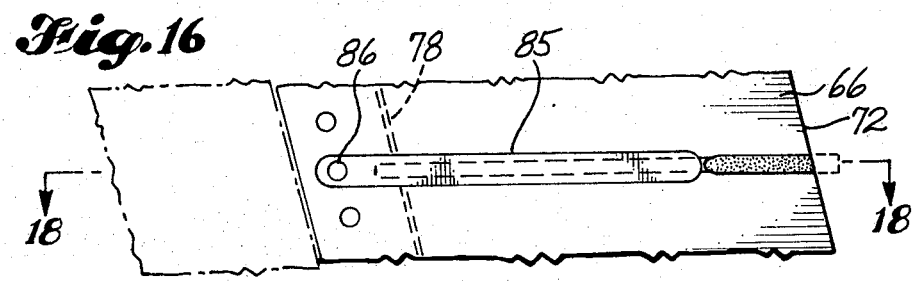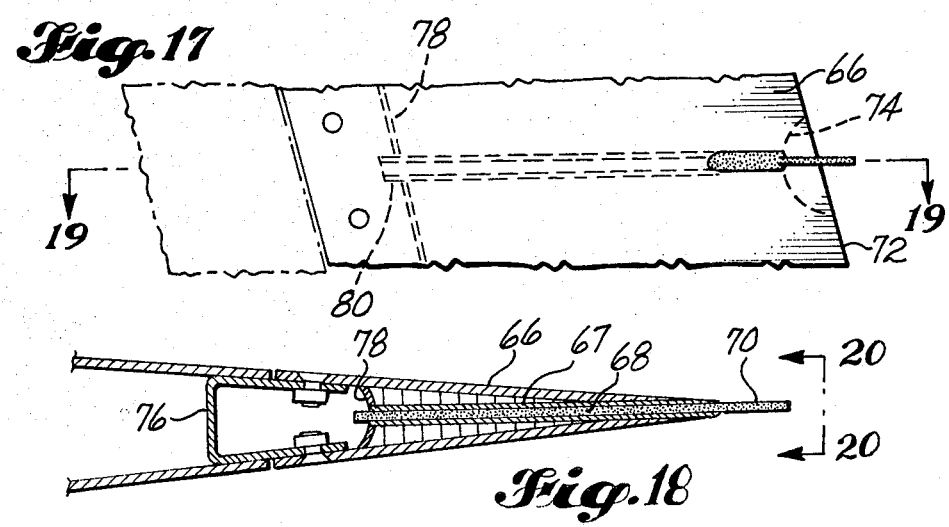

FLUSH PRECIPITATION STATIC DISCHARGER SYSTEM FOR AIRCRAFT

This invention relates to aircraft static discharge systems and more particularly to a zero drag flush mounted surface static discharger system.

Presently, aircraft in flight are known to acquire static electrical charges in several ways. Precipitation charging may be acquired, which includes charging due to rain, snow, ice crystals and dust, this being a major charging mechanism. Such a fact imparts a net electrical charge on an aircraft which, if allowed to accumulate, can produce corona discharge and severe electrical P-Static noise interference in the airborne navigation and communication systems aboard the aircraft. Discharge currents of several milliamperes and airplane voltage of over 200,000 volts have been measured during precipitation charging conditions. The maximum voltage that is attained will be dependent upon the corona threshold of the aircraft which is controlled by the configuration and the radius of curvature of external conductive surfaces (the optimum electrical shape would be a flying sphere or doughnut).

The present state-of-the-art aircraft are required to carry static dischargers for protecting radio systems from precipitation static noise. State-of-the-art designs utilize trailing dischargers and tip dischargers which extend beyond the aerodynamic airfoil surfaces in the form of rods. Such utilization of external rods produces considerable aerodynamic drag and such structures are vulnerable to damage from lightning, hail, vibration and mechanical damage during ground handling; e.g., snow removal. As a consequence, aircraft departure is sometimes delayed if such key dischargers at the extremities are missing or damaged. The key dischargers are usually the most outboard trailing and tip dischargers that are in the highest electrical fields during static charging conditions.

The prior art patent literature includes U.S. Pat. No. 3,755,713 to J. B. Paszkowski, and relates to the application of a knitted wire mesh material onto a glass fiber composite or electrically nonconductive structural panel, such as a flight control surface of an aircraft, for forming an electrically conductive exterior surface that controls the accumulation of electrostatic charge and protects the underlying panel structure from damage by lightning strikes. More specifically, this patent relates to the use of a knitted wire mesh material that is electrochemically compatible with the basic structural metal or remaining metal skin of the aircraft, such that a corrosion-free electrical path between the two materials is produced. In contrast to U.S. Pat. No. 3,755,713 relating to a conductor and lightning strike protector, the present system relates to a precipitation static discharger system.

U.S. Pat. No. 2,933,732 in FIGS. 2 and 3 shows a static discharger. In column 3, line 38 thereof and following, it is stated that the metal at the surfaces near and extending to the tips of the wings and other surfaces may be replaced by some form of plastic structure 30, such as a combination of structural Fiberglas and resin with a metal cylinder embedded in the tips, or preferably some form of metal overlay 32. It is further stated that the plastic structure may be rendered slightly conductive by the addition of lampblack to the resin before layup, or by coating with a resistive paint. The wingtip metal overlay has attached thereto a plurality of sharp metal discharge points 34. Also in U.S. Pat. No. 2,933,732, the location of these discharge points is along the line where the radio frequency field is zero. The trailing edge 36 of the metal overlay is given a sufficiently large radius to insure that there is no tendency for a discharge to occur there . . . . The present system, in contrast, uses composite material as a portion of the static discharger system. Further, the present system minimizes the number of sharp points.

U.S. Pat. Nos. 2,466,024 and 2,466,311 utilize cloth or other fibrous material cemented to the wing vertical stabilizer and horizontal stabilizer trailing edges in a static discharge method. In U.S. Pat. No. 2,466,024, the cloth must be dampened with a conducting liquid. In U.S. Pat. No. 2,466,311, a combination of chemical solutions is used which precipitates a metal onto the cloth fibers to act as a conductor. In FIG. 5 of U.S. Pat. No. 2,466,024, the coating shown at numeral 51 is an insulator to prevent static discharge.

In contrast with the aforementioned approaches to static discharge techniques, a preferred embodiment of the present invention utilizes a method of providing P-Static charge control with static discharger devices that are flush mounted within the aerodynamic surface airfoil contours and have zero or negligible drag penalty on the aircraft. Further embodiments of this system include small protrusions beyond the aerodynamic shape with negligible drag penalty in contrast to the prior art designs showing tip dischargers which extend beyond the aerodynamic airfoil surfaces in the form of rods. The present system concept when utilized on existing aircraft can provide sufficient P-Static protection to allow dispatch of the aircraft if external rod type dischargers are missing or damaged. This may be accomplished by replacing the external rod dischargers with flush dischargers in the critical key areas of removable tip and trailing edge surfaces. The present system may be utilized to replace all external rod dischargers for elimination of such problems associated with these devices.

It is accordingly an object of this invention to provide a static discharger system having flush or minimal protrusions in contrast to sharp rods or needles, which can readily withstand aircraft environment with zero or negligible drag penalty.

It is a further object of the present invention to provide a precipitation static discharger system having composite discharger material oriented and configured to enhance corona discharge from these materials rather than other surfaces of the aircraft where corona discharge is undesirable.

It is yet another object of the present invention to provide a static discharger system having flush discharger surfaces protected by lightning diverter material or available surface flash over coatings in areas where dischargers are subject to lightning strike.

It is still another object of the present invention to provide dischargers configured to replace prior removable or semi-removable surfaces such as tip surfaces in whole or in part on trailing edge surfaces, also in whole or in part or as a modification of such surfaces in whole or in part forming the discharger system.

It is yet another object of the present invention to provide a contouring of conductive surfaces near and adjacent to the discharger material to enhance corona discharge from the discharger rather than from the unwanted conductive areas.

It is still another object of the present invention to provide a static discharger system utilizing composite discharger material which reduces radio noise greater than 35 to 60 decibels when compared to a metal trailing edge surface.

It is yet a further object of the present invention to provide a special configuration static discharger system for a rudder surface as contrasted to a horizontal tail or wing tip surface which accounts for the airflow differences in the tip area for these surfaces.

It is still a further object of the present invention to provide dischargers installed on the underside of non-conductive trailing edge surfaces to provide maximum environmental protection and ease of inspection.

A full understanding of the invention, and of its further objects and advantages and the several unique aspects thereof, will be had from the following description when taken in conjunction with the accompanying drawings in which:

FIG. 12 is illustrative of another configuration for discharger D1 shown in FIG. 4;

FIG. 15 is a view taken along the lines 15 of the discharger of FIG. 12;

FIG. 18 is a discharger configuration of D2 or D3 of FIG. 4 where the aft tip of a rod is extended beyond the trailing edge;

FIG. 16 shows the trailing edge discharger configuration from which the section of FIG. 18 was taken along the lines 18 of FIG. 16;

FIG. 17 shows the trailing edge discharger of FIG. 19 which section in FIG. 19 was taken along the lines 19 of FIG. 17;

Figure 22:
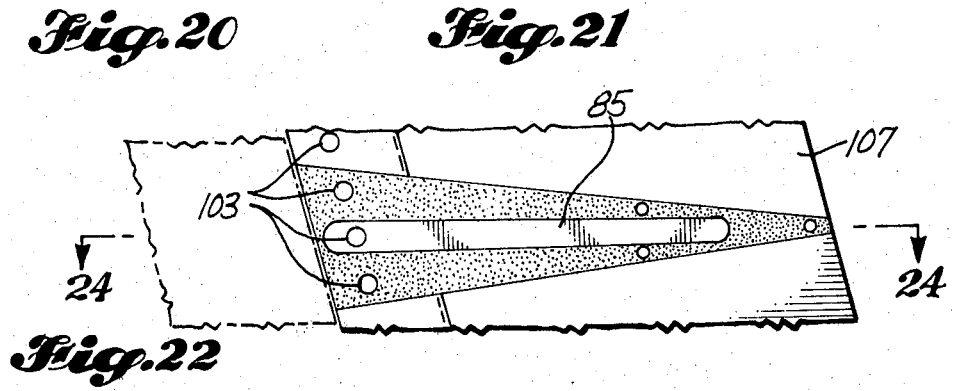
FIG. 22 is an arrangement for the discharger configuration D4 and D5 of FIG. 4 shown attached to a lower skin surface.
Figure 23:
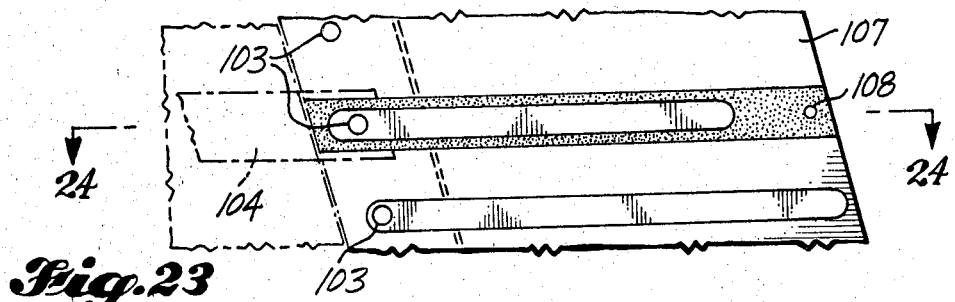
Figure 24:
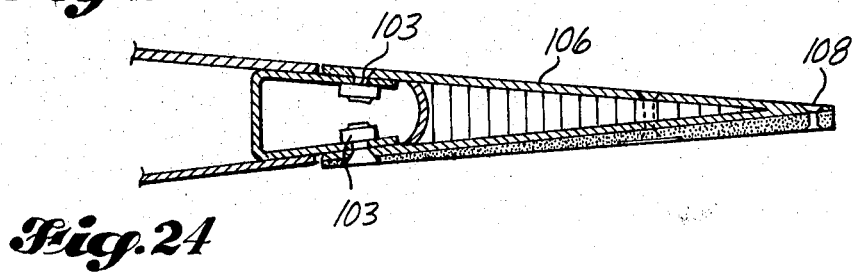

FIG. 23 is a further configuration of discharger D4 and D5 shown attached to the lower outer skin surface for horizontal surfaces; and, FIG. 24 is a sectional view of the embodiments of FIGS. 22 and 23 shown taken along the lines 24 of FIGS. 22 and 23.

Figure 1:
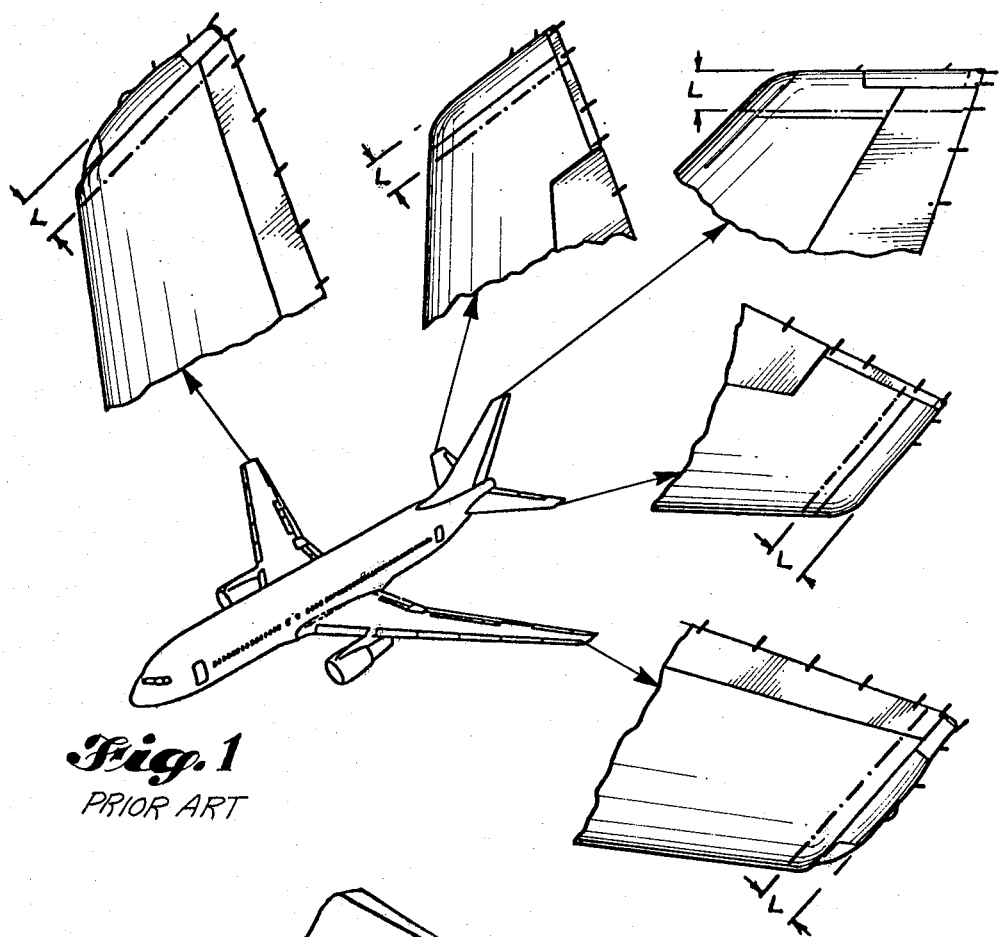
FIG. 1 is a showing of location of typical prior art external rod discharger locations relative to lightning strike zones, L.
Figure 2:
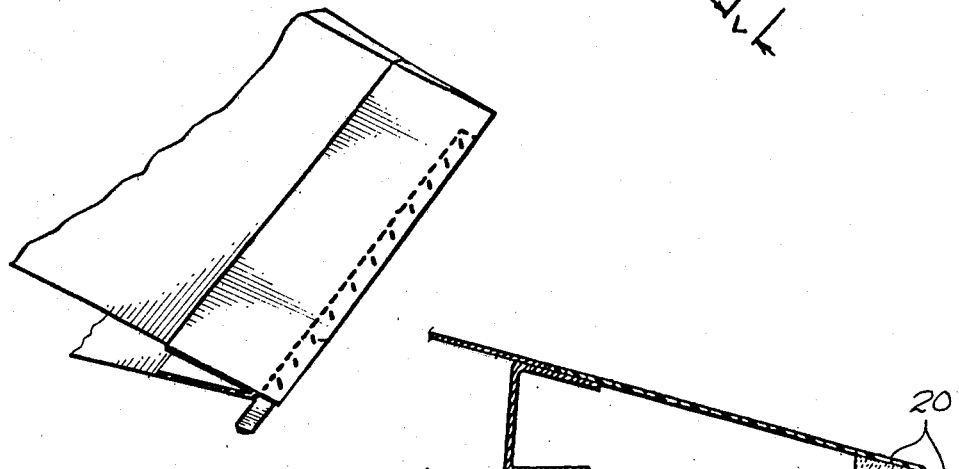
FIG. 2 is illustrative of a prior approach to flush discharger system design wherein needle points protrude from the aircraft skin surface.
Figure 3:
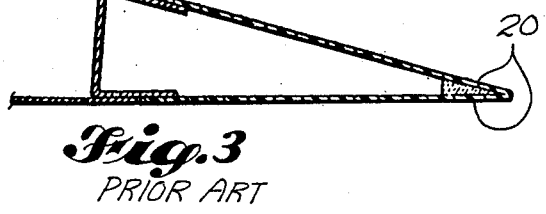
FIG. 3 is an end view of the prior art structure shown in FIG. 2.

Turning now to FIG. 1, it will be seen that typical external rod discharger locations in prior art aircraft design have been located relative to the lightning strike zones indicated at L in FIG. 1. The utilization of external rods has produced considerable aerodynamic drag and are further known to be vulnerable to damage from vibration, lightning and mechanical damage during ground handling. Further prior attempts to design a flush discharger system have been unsuccessful due to the inadequate control of the corona threshold of tip surfaces, orientation of the dischargers, and the use of metal needle discharge points. This can be seen from the prior art structure shown in FIG. 2 where the needle points protruded from the skin surface and were hazardous during ground handling and have the tendency to become dull which could significantly increase the noise level at the control to discharge point. Such needles have been placed in a metal extrusion along the trailing edge as shown, which significantly reduced the electrical fields about the discharger points. Close spacing of needles would tend to make one needle act as an electrostatic shield for the next, thus further reducing the efficiency of the system. As seen in the sectional view of FIG. 3, the discharge points 20 were positioned for minimum coupling determined by electrolytic tank field mapping techniques. Also it should be noted in addition that the Fiberglas skin surface was coated with a conductive paint to electrically connect the discharger to the airframe in a manner which also reduced the electrostatic fields around the discharge points 20.

An important requirement for the flush discharger systems of the present system embodiments hereinafter disclosed to operate effectively, they must quietly discharge at conrolled discharge points (static dischargers) at a rate which will keep the aircraft potential below the corona threshold of all possible uncontrolled noise producing discharge points or surfaces. This requires that all external conductive surfaces exposed to intense electrical fields have a large radius of curvature when compared to the static discharger. The static discharger must also be effective in reducing the noise level by 30 to 60 dB when compared to the uncontrolled discharge from conductive surfaces. The static discharger points and the surrounding aircraft structure must be designed to enhance or increase the electrical fields about the discharger and/or reduce the air pressure at the discharger tip so that the discharger will operate at low voltages to prevent noisy undesirable corona discharge from uncontrolled areas.

Embodiments of the present invention require the use of composite discharger material currently utilized by manufacturers of prior art external rod type dischargers. The discharger material is an electrically conducting material that can be configured in a variety of shapes and resistivities and is capable of reducing P-

Static noise more than 40 to 60 decibels below that of a metal trailing edge.

Figure 4:
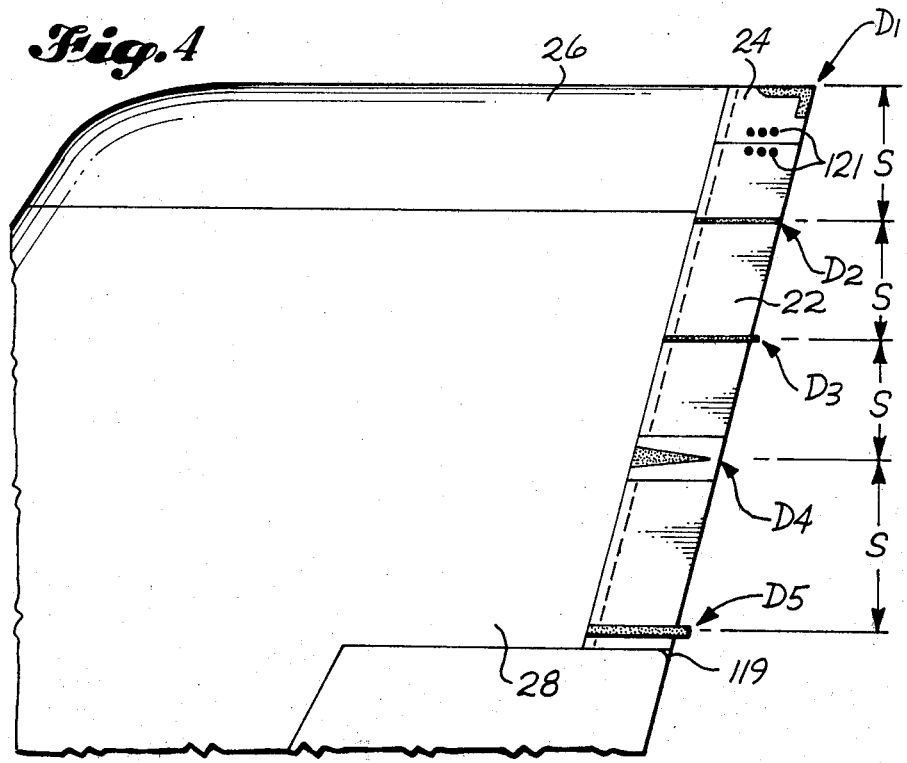
FIG. 4 is illustrative of an embodiment of flush discharger system in accordance with the present invention for a typical airplane tip surface.

Turning now to a first discharger system embodiment as shown in FIG. 4, it will be seen that the system comprises:

1. A discharger structure including a plurality of elements D which is the system from which controlled discharge occurs.
2. A controlled spacing S, orientation and configuration of the discharger elements to maximize the electrical fields around the discharger structure.
3. A controlled shaping and configuration of electrically conductive and nonconductive surfaces in the vicinity of the discharger structure to aid in maximizing the electrical fields around the discharger structure and minimize the possibility of uncontrolled corona from such conductive surfaces.

Referring to FIG. 4, the flush discharger system for a typical aircraft tip surface is shown. The discharger elements D1, D2, D3, D4 and D5 are spaced along the trailing edge 22 and aft tip surface 24. The external tip and trailing edge dischargers normally used in these areas hereinbefore utilized in the prior art and hereinbefore discussed are not required but could be used to supplement this system if desired. The skin surface 26, 28, forward of the trailing edge 22 and aft tip surface 24 are conductive.

For retrofit installation in existing non-metal (e.g. fiberglass) structure, antistatic paint-on conductive coatings (not shown) that are normally utilized must be removed so that the electrical fields can be maximized around the discharge elements. A non-conductive trailing edge 22 means that the entire cross-section is made of non-conductive material. Conductive materials other than the discharge elements may be acceptable in the area where the trailing edge surfaces attach to the airframe; however, they must be designed or shielded so that they do not become objectionable corona points. Isolated metal fasteners may also be acceptable aft of the trailing edge attachment area providing they do not become objectionable corona points or interfere with the operation of the discharger.

Several types of discharge elements geometrical configurations D1, D2, D3, D4, D5 are shown in FIG. 4. Normally one type of discharger element would be used; however, the use of more than one type may be used where system design advantages are realized. For example, it may be desirable to have the more vulnerable outboard discharge elements D1 and D2 completely flush and the more inboard discharge elements D3, D4 and D5 where the electrical fields are normally lower, extend beyond the trailing edge 22 to increase the fields about the aft tip of the discharge element.

Spacing S of the discharge elements along trailing edge 22 would be approximately the same as external rod dischargers which is usually from 6 inches to 36 inches. The spacing S can vary along the trailing edge or be a uniform spacing. Usually the dischargers are spaced closer together in the outboard areas where the electrostatic fields are higher. The aft tip discharger D1 may extend continuously around the tip 24 and trailing edge 22 to take advantage of the higher electrostatic fields in this area.

Discharger Configuration D1

Figure 5:
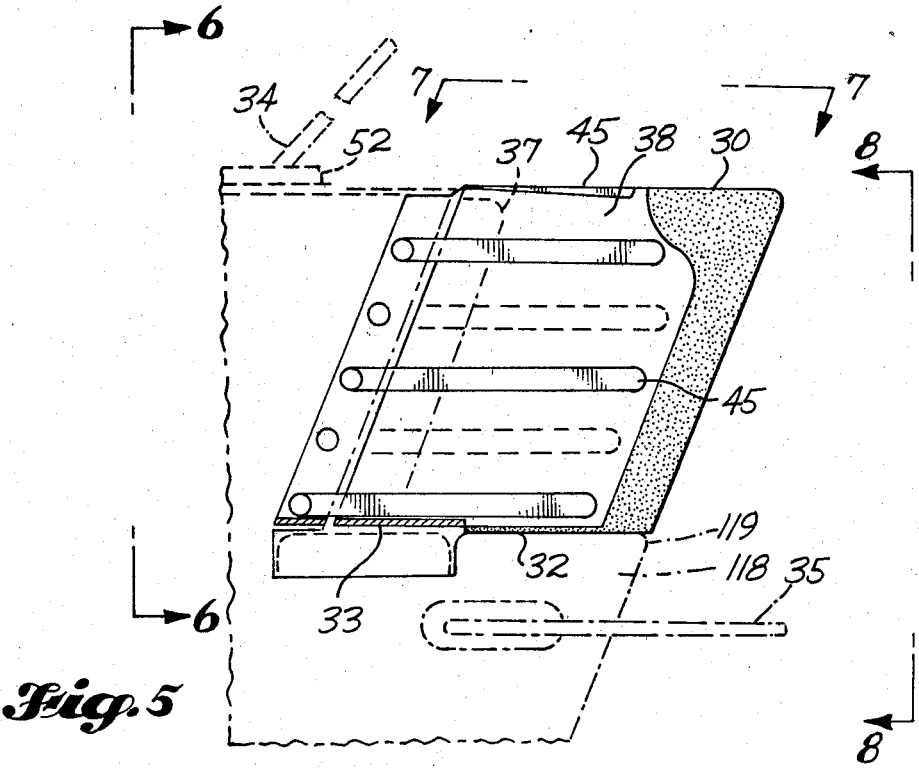
FIG. 5 is illustrative of a discharger configuration D1 shown in FIG. 4 and showing in more detail the discharger D comprising discharger material, a high resistance conductive section and an electrical connection area to electrically connect the discharger element to the air frame of the aircraft.
Figure 7:
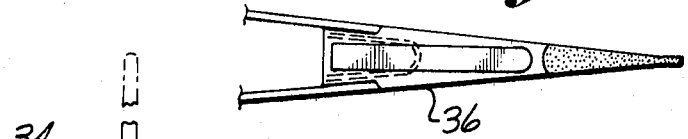
FIG. 7 is a view taken along the lines 7—7 of the discharger D1 shown in FIG. 5.
Figure 6:
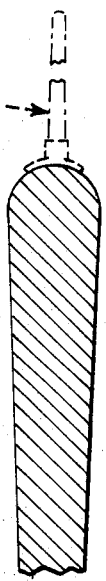
FIG. 6 is a view along the lines 6—6 of discharger D1 shown in FIG. 5.
Figure 8:
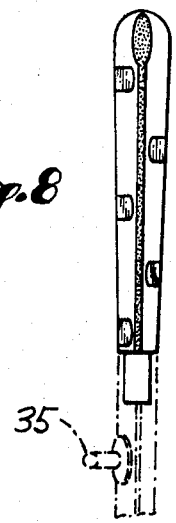
FIG. 8 is a view taken along the lines 8—8 of discharger D1 shown in FIG. 5.
Figure 9:
FIGS. 9, 10 and 11 show various shapings of discharger material to increase the electrical field gradient or reduce air pressure to increase the discharge efficiency.
Figure 10:
Figure 11:
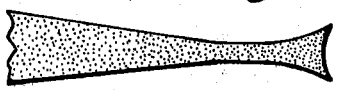
Figure 13:
FIG. 13 is a view taken along the lines 13 of the discharger shown in FIG. 12.
Figure 14:
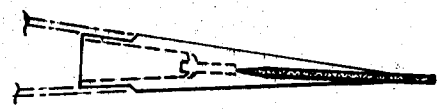
FIG. 14 is a view taken along the lines 14 of the discharger shown in FIG. 12.

Turning to FIG. 5, the discharger D1 consists of discharger material 30, a high resistance conductive section 32 and an electrical connection area 33 to electrically connect the discharger element to the airframe. The entire discharger D1 can be constructed of discharger material comprising e.g. an epoxy carbon fiber composite with carbon fibers exposed in the region 30 or a combination of such material 30, high resistance material 32 and an electrically conductive connector material 33. The electrical connector portion 33 of the discharger element 30 may be metal or other conductive material rather than the aforementioned exemplary discharger material specified. Discharger D1 eliminates the need for external rod type dischargers 34 in the tip areas (as seen in FIGS. 1 and 6) and can replace the critical trailing edge outboard discharger 35 (seen in FIGS. 5 and 8). Discharger material 30 can be shaped (as seen in FIGS. 9, 10, and 11) to increase the electrical field gradient or reduce air pressure to increase the discharge efficiency. All or part of the surface can be made out of the discharger material. The aft rudder tip surface of an airplane which is normally a metal surface is replaced by a tip discharger surface 24 which consists of conductive areas 37, non-conductive areas 38 and discharger material areas 30 (as shown in FIGS. 5 or 12). The structure is designed to weigh approximately the same as the metal tip so that no balancing or flutter problem is introduced. The part may be made to be directly interchangeable with the metal tip. The discharger area 30 is located where the highest electrical fields would exist. Lightning strike diverter tape 45 (e.g. comprising conductive particles such as aluminum bonded on the surface of an electrically insulative dielectric tape) is oriented to protect the tip from lightning strikes.

Referring to a further embodiment shown in FIG. 12, another configuration concept for D1 is shown where the discharger material 30 extends outboard of the airfoil contour 46 (seen in the end view of FIG. 15) to increase the efficiency of the discharger. The extension outboard of the airfoil in this manner would be acceptable for a vertical fin or rudder tip surface but may have too much drag for a wing or horizontal stabilizer surface due to the transverse vortex airflow in these areas. The discharger 48 shown forward of discharger 30 shows a further arrangement for providing a low drag discharger for conductive tip surfaces 50 where additional discharger capability is required to protect critical tip areas. The drag is negligible due to the elimination of the mounting base 52 (see FIG. 5) drag and improving the aerodynamic shape of the discharger. Other features already shown in FIG. 4 can also be incorporated into this embodiment.

Configuration of discharger elements D2, D3 of FIG. 4

Figure 19:
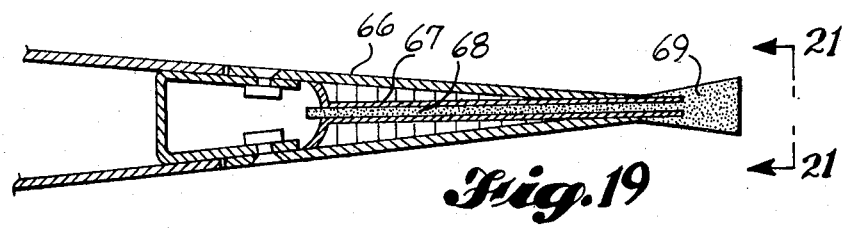
FIG. 19 is a discharger configuration for D2 or D3 of FIG. 4 where the aft tip of a rod is shaped.
Figure 20:
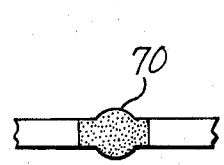
FIG. 20 is an end view of the trailing edge discharger taken along the lines 20—20 of FIG. 18.
Figure 21:
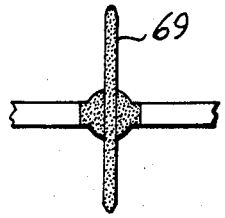
FIG. 21 is an end view of the trailing edge discharger configuration shown in FIG. 19 and taken along the lines 21 in FIG. 19.

Referring now to FIGS. 16 and 17 (corresponding sections at FIGS. 18 and 19 and further corresponding end views at FIGS. 20 and 21), a simple method to modify the non-electrically conductive trailing structure 66 can be accomplished by locating insulative tubes 67 in the trailing edge structure 66. The tube acts as a discharger holder and environmental seal of the core material. The discharger material in the shape of a rod 68 is inserted into the tube. The aft tip of the rod may be shaped 69 and/or extend 70 beyond the trailing edge 72 and/or the trailing edge 72 may be cut away 74 to enhance the electrical field gradient around the tip of the discharger. The forward end of the rod 68 is electrically connected to metal substructure portions 76 and 78 which makes electrical connection to the basic metal airframe. The metal substructure 78 can be shaped to act as a corona shield for conductive structure that may have uncontrolled discharge. The non-metal structure can also be shaped and made electrically conductive to act as a corona shield by coating with low resistance conductive paints. The rods 68 are oriented and spaced to maximize the electrostatic fields at the aft end of the rod (discharger). The rod may be permanently attached or a disconnect device 80 (see FIG. 17) may be used to allow easy removal and replacement if required. The mechanical disconnect can also be the device to electrically connect the rod to conductive substructure. The non-conductive surface 66 in which the discharger is installed cannot have conductive coatings (e.g., antistatic paint) that would tend to electrostatically shield the discharger. To provide ligntning protection for this type of structure in the lightning strike zone L of FIG. 1, lightning strike diverter tapes 85 (comprising, e.g., aluminum particles bonded on the surface of dielectric tape) can be located as shown or the surface can be coated with a commercially available paint type coating that will flash over when lightning attaches to these areas. The diverter material 85 or coating provides a surface flashover characteristic which ionizes the air exterior to the surface to conduct the high currents to the conductive structure by the metal fasteners 86 which minimizes the damage to substructure portions 76, 78 and the discharger D but does not disturb the electrostatic fields (low resistance coatings or sheet metal tapes would not be acceptable).

Discharger Configuration D4, D5

Referring to FIGS. 22 and 23 showing alternative lower outer skin surface discharger configurations for the bottom surface of the section taken in FIG. 24 of attaching edge surface, another method of incorporating the discharger material into insulative trailing edge structure 107 is seen accomplished by shaping the material in a more or less flat form which can be attached to the lower outer skin surface 106 for horizontal surfaces. The material is electrically connected to the metal or electrically conductive substructure via the normal or added fasteners 103 or by connecting to a conductive strap 104 which in turn electrically connects to the airframe if there is no conductive path under the forward end of the discharger. Conductive adhesive may also be used (e.g., silver loaded epoxy) to make the electrical connection. Electrically isolated metal or non-metal fasteners may be utilized to aid in the mechanical attachment of the discharger material providing it does not degrade the operation of the discharger. High dielectric strength coatings 108 may be required over the conductive fasteners. Non-conductive adhesives or fasteners can also be used to attach the discharger material to the skin surface 107. Conductors that connect electrically to the airframe cannot be allowed aft of the electrical connection of the discharger unless the conductors are shaped or insulated to prevent uncontrolled corona discharge and undesirable electrostatic shielding. Conductive surfaces 118 (FIGS. 5, 12) near the dischargers and other areas may require shaping to remove sharp corners. A large full radius 119 (FIGS. 4, 5) is preferred; however, other contours are permitted providing uncontrolled corona discharge does not occur from these surfaces. If the conductive surface 118 (FIGS. 5, 12) must also meet aerodynamic contours, the aerodynamic contour can be made witn non-conductive (e.g., fiberglass) structure or contoured with discharger material. Electrically isolated metal fasteners 121 (FIG. 4) to join non-conductive sections are permitted providing they do not degrade the operation of the discharger.

We claim:

1. A flush mounted static discharger system for use in a tip area of an aircraft structure comprising in combination:
    a composite material having a conductive fiber element portion exposed in the region of said tip area; and,
    an array of lightning strike diverter tape segments disposed on said aircraft structure adjacent said tip area for protecting said tip area from lightning strikes.

2. A flush mounted precipitation static discharger system for an aircraft having a tip surface including a trailing edge portion, said discharger system including an array of discharger elements, said array of discharger elements including inboard and outboard disposed elements, said outboard discharger elements disposed in a flush relationship with respect to said trailing edge portion, and said inboard discharger elements in the region of lower electrostatic field potential with respect to said outboard discharger elements being disposed to extend beyond said trailing edge portion thereby increasing the electrostatic field potential about the aft tip of said discharger.

3. The invention according to claim 2 wherein at least one of said discharger elements includes a rod having a portion inserted into an electrically insulative sleeve.

4. The invention according to claim 3 wherein a further portion of said rod is electrically connected to metal substructure of said aircraft.

5. The invention according to claim 4 wherein said trailing edge portion about a tip of said rod is cut away to enhance the electrostatic field gradient around said tip of said rod.

* * * * *